(12) United States Patent
Hodge

(10) Patent No.: US 6,678,745 B1
(45) Date of Patent: Jan. 13, 2004

(54) DYNAMIC OBJECT SYNTHESIS WITH AUTOMATIC LATE BINDING

(76) Inventor: Bruce Hodge, 54 Wilton Rd., Greenfield, NY (US) 12833

( * ) Notice: Subject to any disclaimer, the term of this patent is extended or adjusted under 35 U.S.C. 154(b) by 445 days.

(21) Appl. No.: 09/583,673

(22) Filed: May 31, 2000

Related U.S. Application Data
(60) Provisional application No. 60/136,957, filed on Jun. 1, 1999.

(51) Int. Cl.$^7$ ................................................ G06F 9/00
(52) U.S. Cl. ........................ 709/331; 709/332; 709/316; 717/162; 717/165; 717/166; 717/153; 707/3; 707/103 Y
(58) Field of Search .................. 709/200, 201, 709/203, 206, 202, 216, 217, 218, 310, 215, 316, 318, 331, 332, 315; 717/100, 103, 108, 120, 116, 118, 111, 153, 162, 165, 166; 707/3, 103 Y

(56) References Cited

U.S. PATENT DOCUMENTS

| | | | | |
|---|---|---|---|---|
| 5,142,681 A | * | 8/1992 | Driscoll et al. ............. | 717/141 |
| 5,303,379 A | * | 4/1994 | Khoyi et al. ................ | 717/166 |
| 5,303,392 A | * | 4/1994 | Carney et al. .............. | 717/153 |
| 5,355,480 A | * | 10/1994 | Smith et al. ................ | 345/718 |
| 5,381,547 A | * | 1/1995 | Flug et al. .................. | 709/331 |
| 5,471,619 A | * | 11/1995 | Messina ...................... | 707/8 |
| 5,551,035 A | * | 8/1996 | Arnold et al. .............. | 709/315 |
| 5,634,128 A | * | 5/1997 | Messina ..................... | 475/168 |
| 5,694,594 A | * | 12/1997 | Chang .......................... | 707/6 |
| 5,872,973 A | * | 2/1999 | Mitchell et al. ............ | 709/332 |
| 6,263,379 B1 | * | 7/2001 | Atkinson et al. ........... | 709/332 |
| 6,308,182 B1 | * | 10/2001 | Nishigaya et al. ...... | 707/103 R |
| 6,401,099 B1 | * | 6/2002 | Koppolu et al. ........ | 707/103 R |
| 6,401,100 B1 | * | 6/2002 | Gladieux ................ | 707/103 R |
| 6,429,880 B2 | * | 8/2002 | Marcos et al. .............. | 345/744 |
| 6,519,764 B1 | * | 2/2003 | Atkinson et al. ........... | 717/120 |
| 6,564,212 B2 | * | 5/2003 | Koskas .......................... | 707/3 |

OTHER PUBLICATIONS

Title: Implementation aspects of an object–oriented DBMS, author: Dogac et al, ACM Mar. 1995.*
Title: A database model for object dynamics, authors: M. P. Papazoglou , B. J. Krämer, ACM, May 1997.*
Title: Dynamic hypertext and knowledge agent systems for multimedia information networks, author: Yoshitaka Shibata, Michiaki Katsumoto , ACM ,Dec. 1993.*

* cited by examiner

*Primary Examiner*—Chameli C. Das
(74) *Attorney, Agent, or Firm*—Baker & McKenzie

(57) ABSTRACT

A method and system of automatically synthesizing object names. Variables are synthesized with object types associated with the variables. Buffers into which data is to be transferred are dynamically created to bind the objects of synthesized variables to the buffers. The method of the present invention invokes a function associated with synthesized names to perform transferring of data into the buffers. In the present invention, objects may be preceded by an object type, e.g., SQL@ symbol, for type identification during the synthesis process.

21 Claims, 4 Drawing Sheets

FIG. 2

Example Code using the Dynamic Object Synthesis with Automatic Late Binding.

```
<html>

<head>
<title>DynaScript Dynamic object synthesis with automatic binding</title>
</head>

<body bgcolor="#FFFFFF">

<center>
<table border="1">

<%
/* DynaScript@Dynamic object synthesis with automatic binding
   The database named "Client" has a table named "ClientList" and
   The ClientList table contains 3 columns named "FirstName", "LastName", "PhoneNumber".
   HodgePodge Software, Inc (c) 1999
*/ print ("<tr><th colspan=\"3\" bgcolor=\"#FFFF00\"> Client List </th></tr>\n");
print ("<tr><th> First Name </th><th> Last Name </th><th> Phone Number </th></tr>") ;

connect("Client");

select * from ClientList;

while(fetch())
{ print("<tr><td> %s </td><td> %s </td><td> %s </td></tr>\n", SQL@FirstName, SQL@LastName, SQL@PhoneNumber);
 // The 3 SQL@ objects above were dynamically synthesized and automatically binded to.
 // Notice that the names of each object matches each respective column name in the table.
%>

</table>
</center>
</body>
</html>
```

OUTPUT VIA WEB BROWSER

ClientList Table Contents

| FirstName | LastName | PhoneNumber |
|---|---|---|
| Bruce | Hodge | 555-1212 |
| Barbara | Hodge | 555-1111 |
| John | Doe | 555-2222 |

FIG. 5

Example Code using the Dynamic Object Synthesis with Automatic Late Binding.

```
<html>

<head>
<title>DynaScript Dynamic object synthesis with automatic binding</title>
</head>

<body bgcolor="#FFFFFF">

<center>
<table border="1">
<%
/* DynascriptaDynamic object synthesis with automatic late binding
   The URL variable named XMLData contains a "ClientList" XML Encoded
   The ClientList element contains 3 attributes named "FirstName", "LastName", "PhoneNumber".
   Hodgepodge Software, Inc (c) 2000
*/ print("<tr><th colspan=\"3\" bgcolor=\"#FFFF00\"> Client List </th></tr>\n");
print("<tr><th> First Name </th><th> Last Name </th><th> phone Number </th></tr>");

// Create a XMLStream Object
XMLStream@ClientList = CreateObject("XMLStream") ;

// Set it's source to the URL variable XMLData
XMLStream@ClientList.source(URL@XMLData);

// While parsing the stream dynamically synthesize the XML variables
while(XMLStream@ClientList.parse())
{ print("<tr><td> %s </td><td> %s </td><td> %s </td></tr>\n", XML@FirstName, XML@LastName, XML@PhoneNumber) ;}
// The 3 XML@ objects above were dynamically synthesized and automatically binded to.
// Notice that the names of each object matches each respective attribute name in the XML stream.
%>

</table>
</center>
</body>
</html>
```

500

DYNAMIC OBJECT SYNTHESIS WITH AUTOMATIC LATE BINDING

CROSS-REFERENCE TO RELATED APPLICATIONS

The present application claims benefit of the filing date of U.S. patent application Ser. No. 60/136,957 entitled DYNAMIC OBJECT SYNTHESIS WITH AUTOMATIC LATE BINDING, filed on Jun. 1, 1999.

TECHNICAL FIELD OF THE INVENTION

The present invention relates generally to computer programming language and particularly, to system and method of dynamic object synthesis with automatic late binding.

BACKGROUND OF THE INVENTION

Currently available scripting languages for example, for manipulating databases or other application systems are typically resource-intensive and are not easy to learn. Accordingly, it is desirable to have a programming language with a command set that are simple to implement and yet efficiently cover what developers need to create high-end interactive applications. It is also desirable that this language include a capability to dynamically synthesize objects and automatically bind them.

SUMMARY OF THE INVENTION

The present invention is directed to a method and system for dynamically synthesizing objects and automatically binding the objects to an associated memory location. The method and system of the present invention determines the objects to synthesize by examining the object type that is embedded in the object identifier or the object name. In the present invention, synthesis is efficiently performed by invoking a method associated with the object type. Because object types are already specified in the object itself, there is no need to refer to class definition files to determine which methods and attributes are available to the object.

The method and system of the present invention dynamically creates buffers to hold data associated with the object. A synthesized symbol name is then inserted into the symbol table and automatically linked or bound to the buffers. The method and system of the present invention also performs the actual transfer of data into the buffers, thus linking the symbol name with actual data.

With the present invention, programmers or writers of programming code need not explicitly declare variables. Instead, the method and system of the present invention automatically synthesizes variables. Consequently, the number of lines of code typically required in software code is reduced thereby reducing the time to develop and implement software code. Because the present invention need not have explicit declarations for each variable used, developing software code becomes faster and easier. Moreover, the present invention enables lines of code to be embedded into code of another language, for example, hypertext markup language ("HTML").

Further, the present invention enhances storage efficiency because less lines of programming code also results in less memory space required to store the code. Moreover, the present invention enables programmers and/or developers to easily identify and isolate errors by visual inspection, thereby enhancing greater ease in debugging codes.

The present invention can be easily integrated into an interactive development environment ("IDE") such as Visual Basic and Java Symantic Cafe. The present invention greatly reduces complexity involved in programming, for example, World Wide Web ("web") page design and implementation because database field names are directly mapped to dynamically synthesized variable names.

Further features and advantages of the present invention as well as the structure and operation of various embodiments of the present invention are described in detail below with reference to the accompanying drawings. In the drawings, like reference numbers indicate identical or functionally similar elements.

BRIEF DESCRIPTION OF THE DRAWINGS

Preferred embodiments of the present invention will now be described, by way of example only, with reference to the accompanying drawings in which:

FIG. 2 illustrates an example of the code using the dynamic object synthesis with automatic late binding of the present invention;

FIG. 5 illustrates an example of code using the dynamic object synthesis with automatic late binding as applied to XML objects.

DETAILED DESCRIPTION OF INVENTION

"The present invention is related to a co-pending U.S. patent application Ser. No. 09/583,672 (Attorney Docket No. 56129050) entitled OBJECT TYPE-DECLARATION PREFIX SYNTAX, filed on May 31, 2000, the disclosure of which is incorporated herein in its entirety by reference thereto."

The dynamic object synthesis with automatic late binding will now be described with reference to FIG. 1 and the example of code illustrated below:

Select*from ClientList; (1)

Select FirstName, LastName, PhoneNumber from ClientList; (2)

While (fetch()) {print(SQL@FirstName, SQL@LastName, SQL@PhoneNumber);} (3)

In the example, select statement (1) is a standard SQL statement that returns all records from the ClientList table. Alternatively, select statement (2) which specifies the column names to select may be used. As shown, the ClientList table has 3 columns, i.e., FirstName, LastName, and PhoneNumber. The dynamic object synthesis with automatic late binding may be actually integrated into the fetcho command shown at (3). Since no objects are supplied with the fetch command, the method and system of the present invention automatically synthesizes by using the column names of a result set as the object names. Next, the method and system of the present invention dynamically creates buffers for the data to transfer into and binds the respective columns of a result set to those object buffers. Result set refers to data fetched, and may include one or more columns. The result set may also include an alias name of one or more joined columns. The method and system of the present invention may actually perform the fetch and transfer the data from the table to the respective object data buffers. The objects are preceded by the SQL@ symbol so that it can be readily determined that they are synthesized from the result set names and that the data is available after the fetch command. An interpreter, for example, the DynaScript® interpreter recognizes that fetch is associated with SQL objects.

Figure 1:
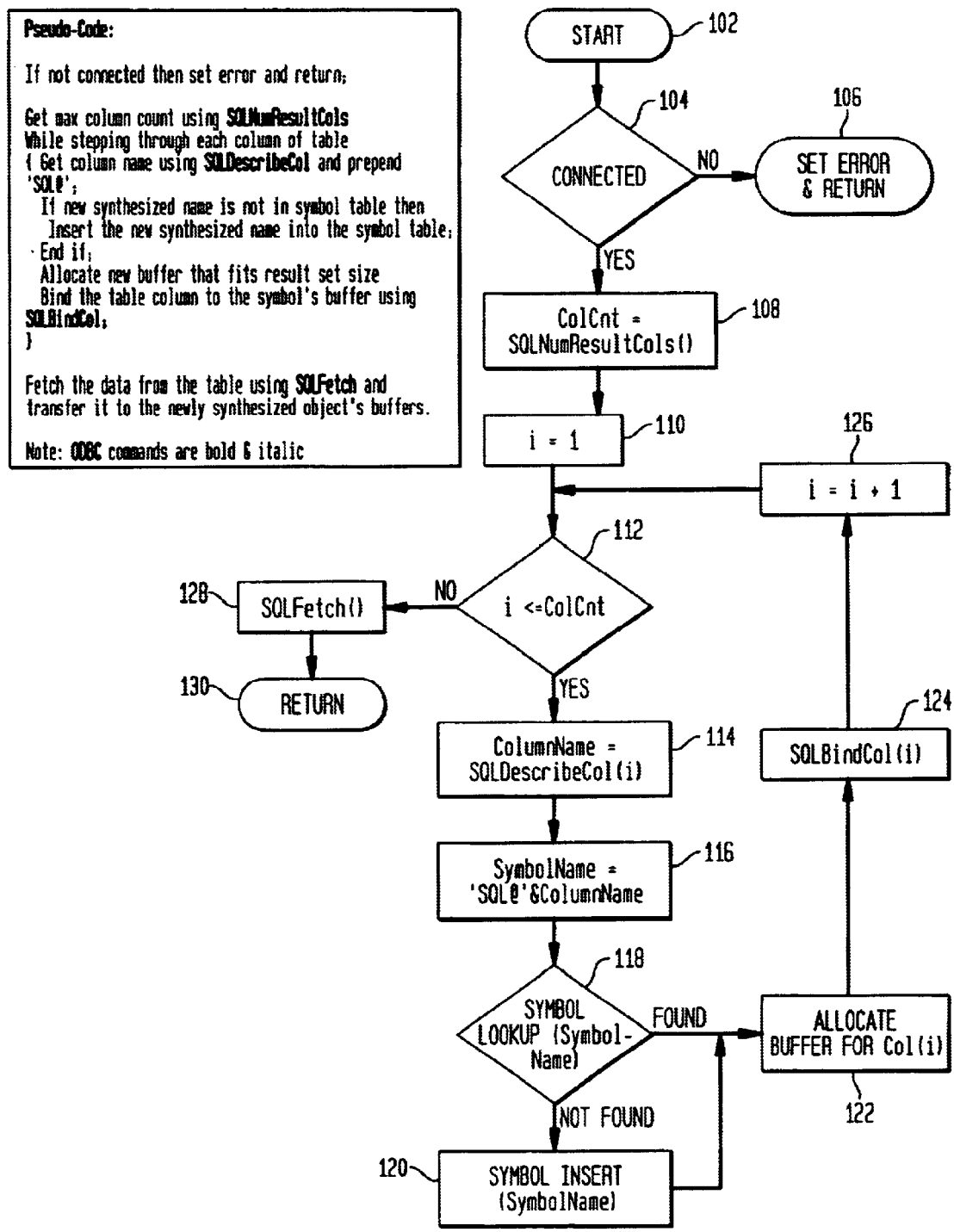
FIG. 1 is a flow diagram illustrating the method of the present invention in one embodiment.

FIG. 1 is a flow diagram illustrating the method of dynamically synthesizing and automatically binding objects in one embodiment. For example, when a fetch command is called, the method and system of the present invention determines whether the command has parameters passed to it. If parameters were passed, those parameters are bound. If no parameters are passed, the process of automatic synthesis of the present invention begins. At step 102, the processing starts. At step 104, a determination whether or not the system is connected is made. If the system is not connected, an error value is set at step 106 and the program returns. If the system is connected, maximum column count for the table is determined at step 108 by using the SQLNumResultCols method in SQL class. At. step 110, an iterative loop with i set to 1, begins for the number of columns found in the table. For each column found, column name and attributes, for example, buffer size, are obtained at step 114 by using SQLDescribecol(i) method. At step 116 "SQL@" symbol is prepended to the column name, forming the synthesized name. At step 188, symbol table is then searched for the synthesized name. If the name does not exist in the symbol table, the synthesized name is inserted into the symbol table. At step 122, the buffer whose size was determined at step 114 is allocated. At step 124, the table column in the symbol table is bound to the allocated buffer using SQLBindcol method. At step 126, count i is incremented so that the loop starting at step 112 is iterated for the number of column counts. At step 112, if i is greater than the column count, the loop terminates. At step 128, SQLFetch() method is executed to fetch the actual data from the database table and to transfer the data to the newly synthesized object's buffers. SQLNumResultCol,s, SQLDescribeCol, SQLBindCol, and SQLFetch are ODBC commands known to those skilled in the art, and therefore, will not be described in greater detail herein.

Figures 3, 4:
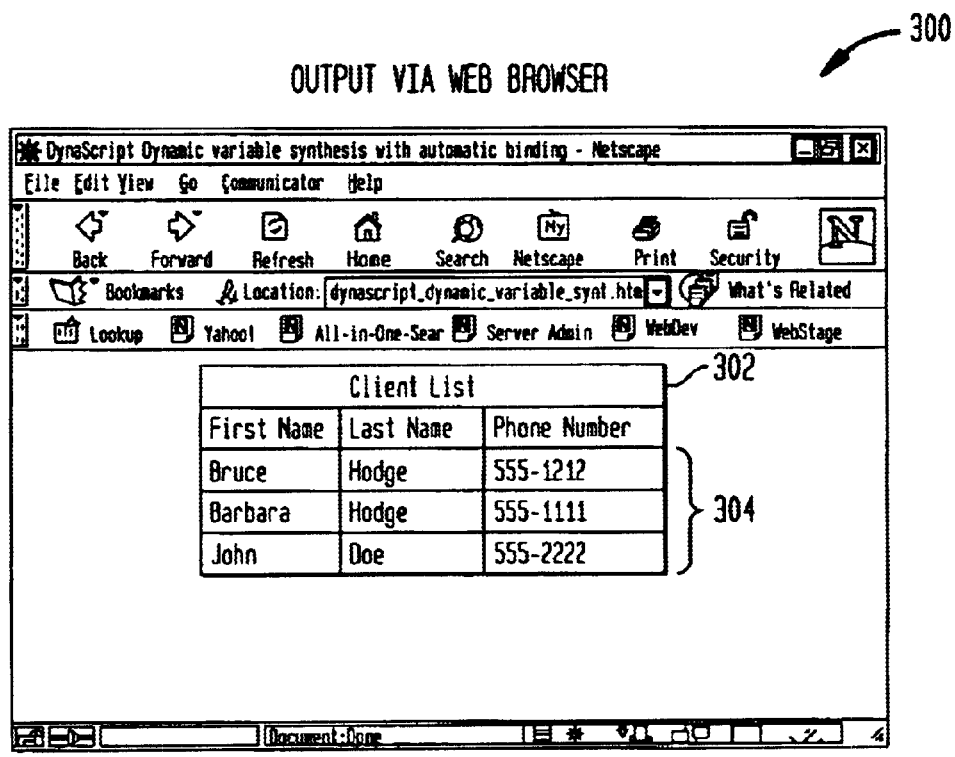
FIG. 3 illustrates a resulting World Wide Web ("web") page displayed after running the code illustrated in FIG. 2.
FIG. 4 illustrates a text page output resulting from the code using the dynamic object synthesis with automatic late binding as shown at FIG. 2.

FIG. 2 illustrates an example of the code using the dynamic object synthesis with automatic late binding of the present invention. The code is embedded in a hypertext markup language ("HTML") file. FIG. 3 illustrates a resulting World Wide Web ("web") page displayed after running the code illustrated in FIG. 2. FIG. 4 illustrates a text page output resulting from the code using the dynamic object synthesis with automatic late binding as shown at FIG. 2. The synthesized column names 302 (FIG. 3) and 402 (FIG. 4) are shown in the results output. Similarly, the data values 304 (FIG. 3) and 404 (FIG. 4) show the values fetched from the database table.

FIG. 5 illustrates an example of code using the dynamic object synthesis with automatic late binding as applied to XML objects. In this example, the parse routine dynamically synthesizes the XML variables while parsing the XML stream of data. Similar methods described with reference to FIG. 1 may be used for synthesizing and binding XML objects.

Symbol tables used in the present invention may be those used in compilers of known systems. Symbol tables typically include a linked list of data structures which include symbol names, pointers to memory that stores data content associated with the symbol names, data types, buffer length, and other information associated with symbol names.

While the invention has been particularly shown and described with respect to a preferred embodiment thereof, it will be understood by those skilled in the art that the foregoing and other changes in form and details may be made therein without departing from the spirit and scope of the invention.

Having thus described our invention, what we claim as new, and desire to secure by letters patent is:

1. A method of dynamically synthesizing and automatically binding objects, comprising:

associating an object type to an object;

automatically retrieving one or more attributes and corresponding data associated with the object type;

determining a name from the one or more attributes;

dynamically generating a symbol name by merging the name with the object type; and binding the symbol name to the corresponding data.

2. The method as claimed in claim 1, further including:

searching a symbol table for the symbol name; and if the symbol name is not found in the symbol table, inserting the symbol name into the symbol table.

3. The method as claimed in claim 1, further including:

invoking a function associated with the object type to retrieve data associated with the symbol name.

4. The method as claimed in claim 1, wherein the associating includes associating the object type to the object by examining an identifier string of characters identifying the object.

5. The method as claimed in claim 1, further including:

determining a count of names associated with the object; and performing the determining a name, merging, and binding for each of the names in the count.

6. The method as claimed in claim 1, wherein the determining a name includes invoking a predefined function associated with the object type to determine the name.

7. The method as claimed in claim 1, wherein the merging includes embedding the object type with the name.

8. The method as claimed in claim 1, wherein the merging includes prepending the object type to the name.

9. The method as claimed in claim 1, wherein the merging includes appending the object type to the name.

10. The method as claimed in claim 1, wherein the binding includes linking the symbol name to a buffer for holding the corresponding data.

11. The method as claimed in claim 10, wherein the binding includes invoking a predefined function associated with the object type to assign data to the buffer.

12. The method as claimed in claim 1, wherein the allocating includes dynamically allocating a buffer to hold data associated with the symbol name.

13. The method as claimed in claim 1, wherein the method further includes:

determining size of the data associated with the symbol name; and allocating a buffer of the determined size to hold data associated with the symbol name.

14. A program storage device readable by machine, tangibly embodying a program of instructions executable by the machine to perform method of dynamically synthesizing and automatically binding object, comprising:

associating an object type to an object;

automatically retrieving one or more attributes associated with the object type;

determining a name from the one or more attributes;

dynamically generating a symbol name by merging the name with the object type; and binding the symbol name to the corresponding data.

15. The program storage device as claimed in claim 14, further including dynamically allocating a buffer to hold data associated with the symbol name.

16. The program storage device as claimed in claim 14, further including:

determining size of data associated with the symbol name; and allocating a buffer of the determined size to hold data associated with the symbol name.

17. The method of claim 1, wherein the data is a reference pointer.

18. The program storage device of claim 14, wherein the data is a reference pointer.

19. A method of dynamically synthesizing and automatically binding objects, comprising:

associating an object type to an object at run time;

automatically retrieving one or more attributes and corresponding data associated with the object type at run time;

determining a name from the one or more attributes at run time;

merging the name with the object type to generate a symbol name at run time; and binding the symbol name to the corresponding data at run time.

20. A program storage device readable by machine, tangibly embodying a program of instructions executable by the machine to perform method of dynamically synthesizing and automatically binding object, comprising:

associating an object type to an object;

automatically retrieving one or more attributes and corresponding data associated with the object type;

automatically synthesizing a name with the object type to generate a symbol name at run time; and binding the symbol name to the corresponding data at run time.

21. The program storage device of claim 20, wherein the automatically synthesizing comprises:

determining a name from the one or more attributes; and merging the name with the object type to generate the symbol name.

* * * * *